(12) United States Patent
Johanna et al.

(10) Patent No.: US 12,202,505 B2
(45) Date of Patent: Jan. 21, 2025

(54) AUTOMATED INFERENCE OF A CUSTOMER SUPPORT REQUEST IN AN AUTONOMOUS VEHICLE

(71) Applicant: GM Cruise Holdings LLC, San Francisco, CA (US)

(72) Inventors: Livia Johanna, San Francisco, CA (US); Bridget Collins, San Francisco, CA (US); MinJie Tong, Issaquah, WA (US); David Shuckerow, Seattle, WA (US); Christopher Warren, Seattle, WA (US); Bharatkumar Patel, Fremont, CA (US); Yosser D'Avanzo, Brandon, FL (US); Bonnie Lin, El Cerrito, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 228 days.

(21) Appl. No.: 17/893,165

(22) Filed: Aug. 22, 2022

(65) Prior Publication Data
US 2024/0059307 A1    Feb. 22, 2024

Related U.S. Application Data

(63) Continuation of application No. 17/893,152, filed on Aug. 22, 2022.

(51) Int. Cl.
*B60W 50/14*    (2020.01)
*B60W 50/00*    (2006.01)
(Continued)

(52) U.S. Cl.
CPC ............ *B60W 50/14* (2013.01); *B60W 50/00* (2013.01); *B60W 50/04* (2013.01); *B60W 60/00* (2020.02); *B60W 60/001* (2020.02); *B60W 2050/0028* (2013.01); *B60W 2050/0052* (2013.01); *B60W 2050/146* (2013.01); *B60W 2420/403* (2013.01);
(Continued)

(58) Field of Classification Search
CPC ...... B60W 50/14; B60W 50/00; B60W 50/04; B60W 60/00; B60W 60/001; B60W 2050/0028; B60W 2050/0052; B60W 2050/146; B60W 2420/403; B60W 2420/408; B60W 2420/54; B60W 2540/221; B60W 2554/00; B60W 2555/20; B60W 2556/10; B60W 2556/45; B60W 2556/65; B60W 50/08; G05D 1/227; G05D 1/6987; G05D 2105/22; G05D 2107/13;
(Continued)

(56) References Cited

U.S. PATENT DOCUMENTS 9,599,986 B1 * 3/2017 Eberbach ............ B60W 60/007
11,460,314 B1 * 10/2022 Ziniti .................. G10L 15/1815
(Continued)

*Primary Examiner* — Donald J Wallace
*Assistant Examiner* — Jalal C Coduroglu
(74) *Attorney, Agent, or Firm* — Wade C. Yamazaki

(57) ABSTRACT

A method of providing an onboard assistant for a vehicle, comprising: receiving sensor data from sensors of the vehicle; transforming the sensor data using a trained machine learning model to provide transformed sensor data; inferring from the transformed sensor data that a special condition for the vehicle requires intervention; and contacting an operator of the vehicle to inform the operator of the special condition and receive instructions for handling the special condition.

20 Claims, 8 Drawing Sheets

(51) Int. Cl.
  *B60W 50/04* (2006.01)
  *B60W 60/00* (2020.01)
(52) U.S. Cl.
  CPC ... *B60W 2420/408* (2024.01); *B60W 2420/54* (2013.01); *B60W 2540/221* (2020.02); *B60W 2554/00* (2020.02); *B60W 2555/20* (2020.02); *B60W 2556/10* (2020.02); *B60W 2556/45* (2020.02); *B60W 2556/65* (2020.02)
(58) Field of Classification Search
  CPC .... G05D 2109/10; G06N 20/00; G06Q 50/40; G06Q 50/47
  See application file for complete search history.

(56) References Cited

U.S. PATENT DOCUMENTS

| | | | |
|---|---|---|---|
| 11,762,371 B1* | 9/2023 | SayyarRodsari | G05B 19/4155 700/28 |
| 2015/0012169 A1* | 1/2015 | Coard | G06Q 10/06316 705/305 |
| 2016/0036899 A1* | 2/2016 | Moody | H04L 67/141 709/217 |
| 2016/0071388 A1* | 3/2016 | Levons | G08B 21/24 340/584 |
| 2017/0278315 A1* | 9/2017 | Christofferson | G07C 5/008 |
| 2017/0372431 A1* | 12/2017 | Perl | G07C 5/008 |
| 2018/0088571 A1* | 3/2018 | Weinstein-Raun | G05D 1/0276 |
| 2019/0219994 A1* | 7/2019 | Yan | G05B 13/027 |
| 2019/0332875 A1* | 10/2019 | Vallespi-Gonzalez | G06F 18/217 |
| 2019/0384303 A1* | 12/2019 | Muller | G08G 1/166 |
| 2020/0209846 A1* | 7/2020 | Chen | G05D 1/0231 |
| 2020/0223444 A1* | 7/2020 | Bonanni | G06V 20/597 |
| 2020/0317216 A1* | 10/2020 | Konrardy | B60W 30/182 |
| 2021/0354690 A1* | 11/2021 | Yershov | G05D 1/0274 |
| 2021/0368007 A1* | 11/2021 | Hasegawa | H04L 67/10 |
| 2021/0385325 A1* | 12/2021 | Tian | G06F 3/14 |
| 2022/0068053 A1* | 3/2022 | Hinduja | B60W 50/0205 |
| 2022/0182498 A1* | 6/2022 | Singh | G08G 1/16 |
| 2022/0185299 A1* | 6/2022 | Ye | G06V 20/58 |
| 2022/0234588 A1* | 7/2022 | Szelest | B60W 50/0205 |
| 2022/0261658 A1* | 8/2022 | Souly | G06N 3/045 |
| 2022/0289138 A1* | 9/2022 | Gammelgard | G06T 19/006 |
| 2023/0171275 A1* | 6/2023 | Valasek | H04L 12/40 726/23 |

* cited by examiner

AUTOMATED INFERENCE OF A CUSTOMER SUPPORT REQUEST IN AN AUTONOMOUS VEHICLE

PRIORITY DATA

The present application claims priority to US Non-Provisional application having the same title, filed on Aug. 22, 2022, with Ser. No. 17/893,152 (the '152 application). The '152 application is hereby incorporated by reference in its entirety.

FIELD OF THE SPECIFICATION

The present disclosure relates generally to autonomous vehicles (AVs), and more particularly, though not exclusively, to automated inferences for onboard assistants in an AV.

BACKGROUND

AVs, also known as self-driving cars, driverless vehicles, and ridehail vehicles, are vehicles that use multiple sensors to sense the environment and move without human input. Automation technology in the AVs enables the vehicles to drive on roadways and to perceive the vehicle's environment accurately and quickly, including obstacles, signs, and traffic lights. The vehicles may be used to pick up passengers and drive the passengers to selected destinations. The vehicles may also be used to pick up packages and/or other goods and deliver the packages and/or goods to selected destinations.

SUMMARY

A method of providing an onboard assistant for a vehicle, comprising: receiving sensor data from sensors of the vehicle; transforming the sensor data using a trained machine learning model to provide transformed sensor data; inferring from the transformed sensor data that a special condition for the vehicle requires intervention; and contacting an operator of the vehicle to inform the operator of the special condition and receive instructions for handling the special condition.

BRIEF DESCRIPTION OF THE DRAWINGS

The present disclosure is best understood from the following detailed description when read with the accompanying FIGURES. In accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

DETAILED DESCRIPTION

Overview

Figure 1:
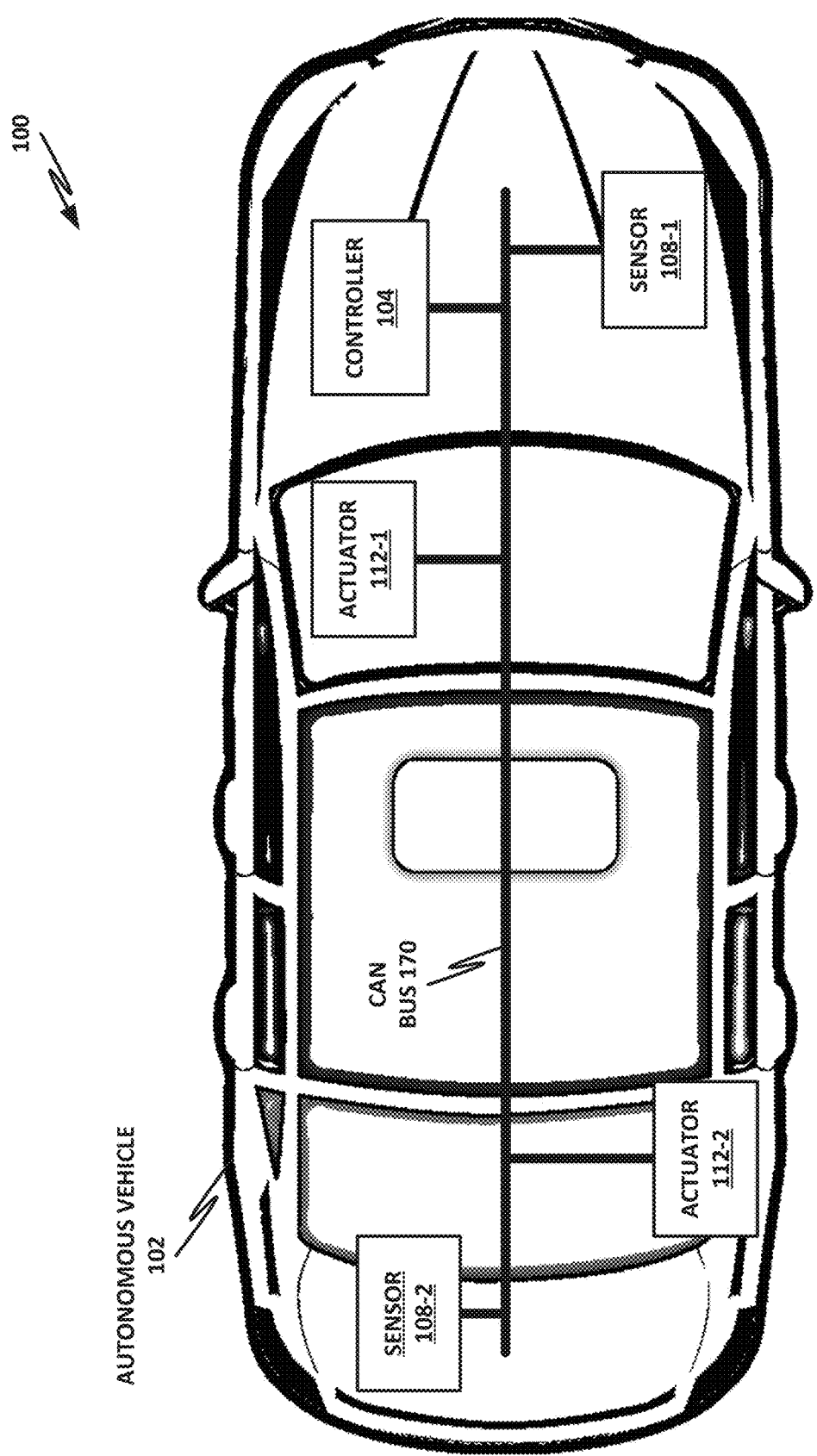
FIG. 1 is a block diagram of selected elements of an AV system.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

AVs and vehicles with semi-autonomous features like automatic driver assist systems (ADAS) may include features, such as an onboard assistant. Onboard assistants may handle a range of user interactions, including emergency and non-emergency situations. For example, an onboard assistant may provide a button that a driver or passenger may press to be placed in contact with a service center. Service agents may then speak with the driver or passenger and help address issues or resolve concerns. The onboard assistant may also receive sensor data from the vehicle, and in certain situations may automatically place a call. For example, a call may be placed automatically in the case of a collision, mechanical failure, law enforcement interaction (e.g., the car was pulled over), obstruction, dangerous weather conditions, or similar. One use case of an AV includes operating a fleet of ridehail vehicles. These may be ridehail vehicles that operate without a human driver. As used herein, AV supported ridehail services may include other services, such as ride share services and delivery services.

An end user for ridehail services may install a mobile app on his or her cellular phone or mobile device and may provide profile and/or billing information. Depending on the passenger's privacy preferences, he or she may share additional information that may be used to customize or personalize the ride experience. When the end user needs to go somewhere, he or she may use the ridehail app to request a ride with a ridehail vehicle, including a desired destination. The AV operator may have a fleet of ridehail vehicles and may dispatch a ridehail vehicle to the end user's destination to pick the passenger up and take him or her to the desired destination.

In the context of a ridehail vehicle service, an onboard assistant may assume additional significance. As some users may not be familiar or accustomed to ridehail vehicle services, many users may initially find it unsettling to ride in a car without a human operator, and that may in fact lack human driving equipment altogether (e.g., it may lack a steering wheel, accelerator, brake pedals, etc.). In these cases, the onboard assistant may constitute the sole or at least primary person-to-person interaction for the passenger.

Providing a suitable onboard assistant, and providing effective service and/or action by the onboard assistant are not trivial tasks. The AV may be in one of a variety of scenarios (e.g., sensor and robotic system data may be different for different scenarios). Different end users may benefit from different kinds of services/actions provided by the onboard assistant. Even for a same end user, different services/actions may be provided by the onboard assistant, depending on contextual information of a given point in time.

Embodiments of the present specification provide an onboard assistant with the ability to infer a special circumstance that may require intervention by the AV controller, or that may require placing a call to a service center provided by the AV operator. In embodiments, the onboard assistant may provide automated triggers to request customer support or rider support from within the vehicle, which may be, for example, a ridehail vehicle or other fully autonomous vehicle or a semi-autonomous vehicle.

Embodiments may include the ability to filter and transform sensor and robotic system data from the AV. The system may then identify states of the AV that may require assistance from a human company representative. The onboard assistant may transform sensor and state logs from the ridehail vehicle into a concrete request for human assistance. The concrete request may allow the onboard assistant to respond automatically to events like a flat tire that may otherwise require a human operator to physically inspect the vehicle. In embodiments, sensor and state data may initially be filtered and then passed through a transform model that provides useful decision states for the AV. These useful decision states may include, for example, inferring that the AV has experienced a collision, is engaged in a law enforcement interaction, has encountered external hostility, has detected hostility or vandalism within the cabin, has detected a medical emergency for the occupant, or other inferences.

Various special circumstances or conditions may require human intervention, from a standard service agent or service expert, depending on the circumstance. Thus, the onboard assistant may make inferences based on, for example, historical session information, state of the AV, AV sensor data, trip information, rider sentiment, external factors, weather, obstructions, or similar. If the AV controller determines that intervention of a service specialist or expert is desirable, the AV controller may place the occupant in communication with a service representative. In some embodiments, the occupant may have a tablet that he or she may use to interact with the vehicle, check maps, surf the internet, play games, provide entertainment, stream audio and/or video, or other functions. To assist the service agent, the AV controller may mirror a graphical interface of the tablet screen from within the AV to a console provided to the service agent. Mirroring may allow the service agent to see exactly what the user is seeing on the tablet and provide additional contextual information to the service agent.

The foregoing may be used to build or embody several example implementations, according to the teachings of the present specification. Some example implementations are included here as non-limiting illustrations of these teachings.

Exemplary AV

A system and method for automated inference of a rider support request in an AV will now be described with more particular reference to the attached FIGURES.

FIG. 1 is a block diagram 100 illustrating an exemplary AV 102. AV 102 may be, for example, an automobile, car, truck, bus, train, tram, funicular, lift, or similar. AV 102 could also be an autonomous aircraft (fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not intended to be limited to a particular vehicle or vehicle configuration.

In this example, AV 102 includes one or more sensors, such as sensor 108-1 and sensor 108-2. Sensors 108 may include, by way of illustrative and non-limiting example, localization and driving sensors such as photodetectors, cameras, radio direction and ranging (RADAR), sound navigation and ranging (SONAR), light direction and ranging (LIDAR), GPS, inertial measurement units (IMUs), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view. Embodiments may include a suite of sensors that collect data about the surrounding environment, which may include, by way of illustrative and non-limiting example, a pressure sensor that detects a flat tire on the vehicle. Additional sensors could also include collision sensors, environmental sensors that may detect adverse weather conditions, internal or external cameras that may detect obstructions or dangerous situations (e.g., someone or something is blocking the AV or otherwise threatening the AV), the presence of rain, fog, smoke, and others. In the same or a different embodiment, sensors may be used to identify a rider sentiment and enable an appropriate response to be provided based on the rider sentiment.

AV 102 may further include one or more actuators 112. Actuators 112 may be configured to receive signals and to carry out control functions on AV 102. Actuators 112 may include switches, relays, or mechanical, electrical, pneumatic, hydraulic, or other devices that control the vehicle. In various embodiments, actuators 112 may include steering actuators that control the direction of AV 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of AV 102.

A controller 104 may provide the main control logic for AV 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of AV 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of AV 102 may communicate with one another via a bus, such as controller area network (CAN) bus 170. CAN bus 170 is provided as an illustrative embodiment, but other types of buses may be used, including wired, wireless, fiberoptic, infrared, WiFi, Bluetooth, dielectric waveguides, or other types of buses. Bus 170 may implement any suitable protocol. Bus 170 may also enable controller 104, sensors 108, actuators 112, and other systems and subsystems of AV 102 to communicate with external hosts, such as internet-based hosts. In some cases, AV 102 may form a mesh or other cooperative network with other AVs, which may allow sharing of sensor data, control functions, processing ability, or other resources.

Figure 8:
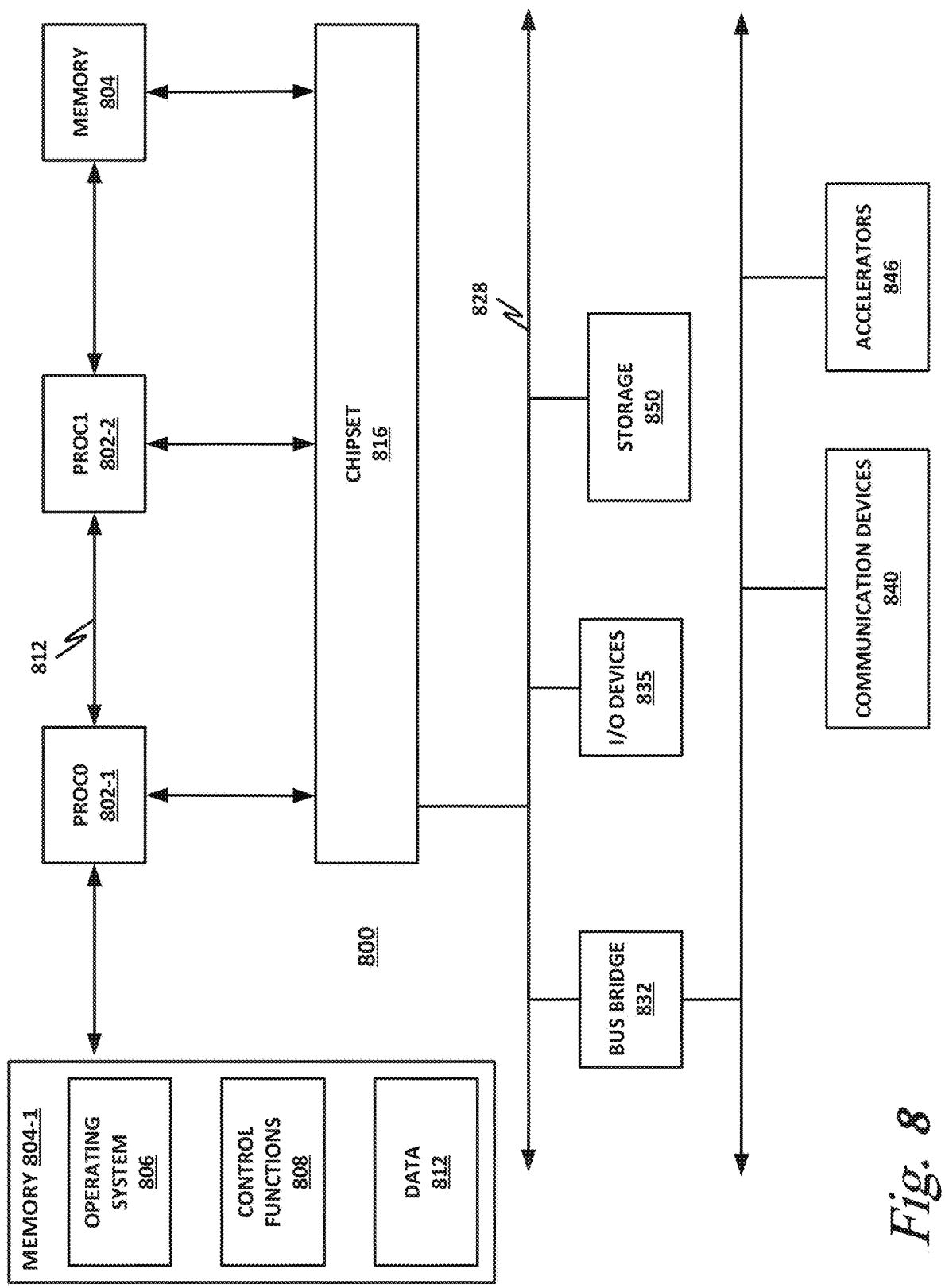
FIG. 8 is a block diagram of selected elements of a hardware platform.

Controller 104 may control the operations and functionality of AV 102, or one or more other AVs. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 8, which may represent a suitable computing platform for controller 104. In some cases, controller 104 may be connected to the internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by AVs.

According to various implementations, AV 102 may modify and/or set a driving behavior in response to parameters set by vehicle passengers (e.g., via a passenger interface) and/or other interested parties (e.g., via a vehicle coordinator or a remote expert interface). Driving behavior of an AV may be modified according to explicit input or feedback (e.g., a passenger specifying a maximum speed or a relative comfort level), implicit input or feedback (e.g., a passenger's heart rate), or any other suitable data or manner of communicating driving behavior preferences.

AV 102 is illustrated as a fully autonomous automobile but may additionally or alternatively be any semi-autonomous or fully autonomous vehicle. In some cases, AV 102 may switch between a semi-autonomous state and a fully autonomous state and thus, some AVs may have attributes of both a semi-autonomous vehicle and a fully autonomous vehicle depending on the state of the vehicle.

Exemplary AV Controller

Figure 2:
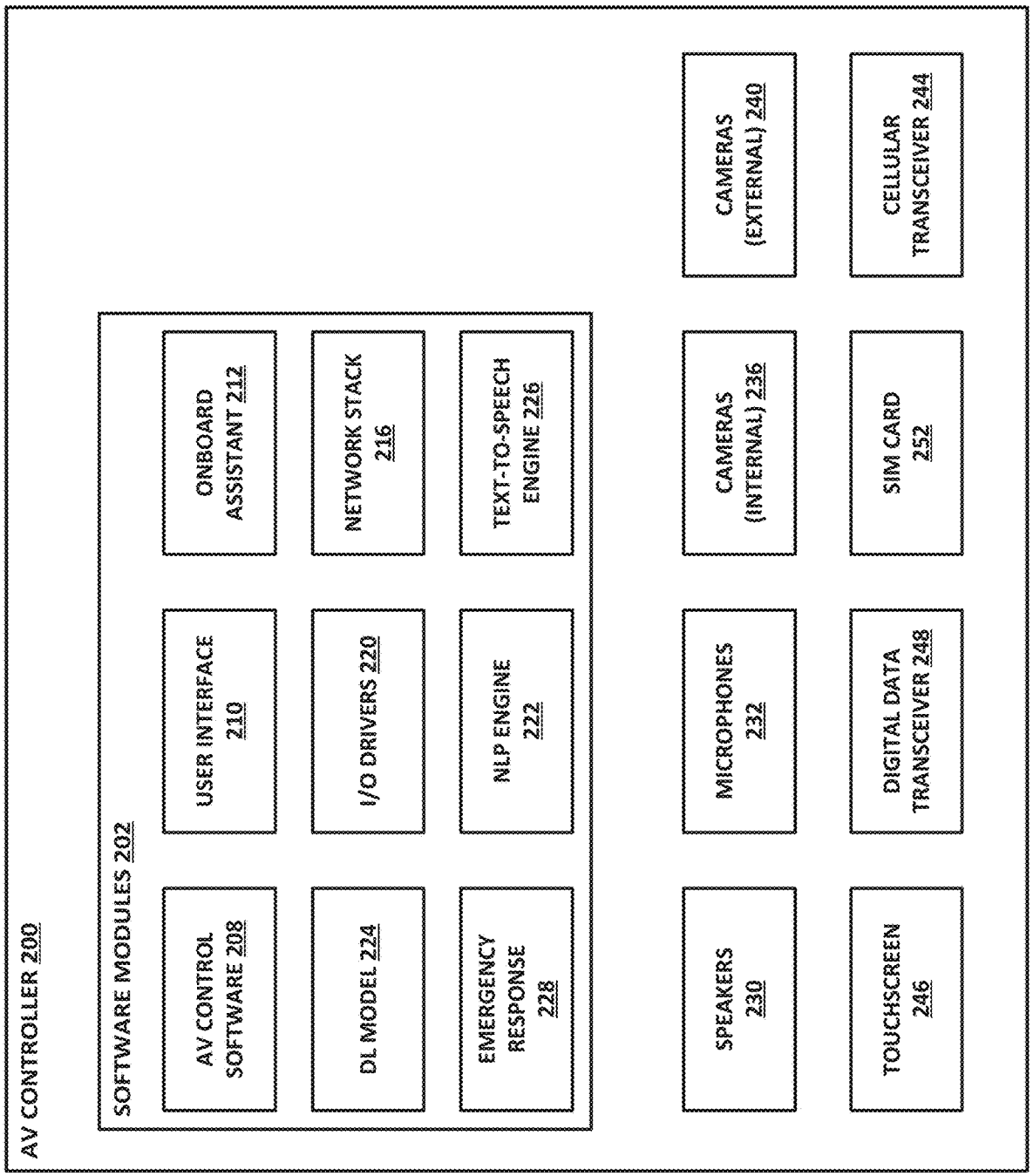
FIG. 2 is a block diagram of selected elements of an AV controller.

FIG. 2 is a block diagram of selected elements of an AV controller 200. Elements disclosed here are selected to illustrate operative principles of the present disclosure. Embodiments may include elements other than those disclosed here, and embodiments need not necessarily include all elements disclosed here.

AV controller 200 may be based on a hardware platform. The hardware platform may include a processor, memory, and other elements to provide the hardware infrastructure for AV controller 200. Examples of additional selected elements of a hardware platform are illustrated in FIG. 8 below.

AV controller 200 may include several peripheral devices that assist the AV controller in performing its function. These may include, by way of illustrative and non-limiting example, speakers 230, microphones 232, internal cameras 236. External cameras 240, touchscreen 246, digital data transceiver 248, subscriber identity module (SIM) card 252, and cellular transceiver 244.

Speakers 230 may be located internally and/or externally to the cabin of the vehicle and may be used to provide audible feedback to an occupant of the cabin of the cabin, or to people outside the vehicle. Microphones 232 may also be disposed within or without the vehicle and may be used to pick up audible cues from the environment. For example, microphones 232 may be used to detect speech, to monitor the environment, or to hear sounds such as sirens, horns, disturbances, or similar.

Internal cameras 236 may be used to monitor the interior of the vehicle, such as to monitor activity of occupants of the cabin of the vehicle. External cameras 240 may be used to monitor the external environment. External cameras 240 may be an integral part of the autonomous operation, which may rely in part on computer vision to identify visual elements of the external environment. Computer vision may enable the AV controller software to provide autonomous or semi-autonomous control of the vehicle. In embodiments, a camera may be used to identify contextual information, such as whether someone outside the car is attempting to block the car (such as in the context of a protest or threat).

Touchscreen 246 may provide an I/O interface for an occupant or passenger of the vehicle. Touchscreen 246 may be similar to a tablet, and may be a standalone device, or may be integrated into the AV as a fixture. In the same or a different embodiment, touchscreen 246 may be provided by a mobile device, laptop computer, or other device owned and provided by the passenger. Touchscreen 246 may provide a facility for the passenger to type messages, send texts, view maps, play games, communicate with the vehicle, communicate with rider support, or perform other actions that may be useful to the passenger or occupant.

Digital data transceiver 248, SIM card 252, and cellular transceiver 244 may form a communication suite. For example, digital data transceiver 248 may provide a network interface to a digital data service, such as a long-term evolution (LTE) fourth-generation (4G) service, a fifth-generation (5G) service, or some other similar wired or wireless digital data service. Digital data transceiver 248 may communicatively couple AV controller 200 to the internet or to other network services. SIM card 252 may operate with cellular transceiver 244 to provide voice communication via cellular communication networks. Sim card 252 provides a unique identity on the cellular network and may provide, for example, a phone number or other identifier for AV controller 200. Cellular transceiver 244 may include the hardware, software, and firmware elements to provide communication with a voice-based cellular communication network.

In embodiments, cellular transceiver 244 may be either a digital or an analog cellular network connection. In the case of a digital connection, cellular transceiver 244 may digitize voice communications and optionally compress data before sending the data over the cellular network.

AV controller 200 may also include a plurality of software modules 202. Software modules 202 may run on an operating system, such as an embedded or real-time operating system provided by AV controller 200. Software modules 202 provide various functions and facilities and may interact with appropriate hardware elements in performing their functions. The division of software elements within software modules 202 is provided as a logical division and is not necessarily representative of a physical division. In some cases, various software modules may run as dedicated services or microservices on AV controller 200 and may be isolated or sandboxed from one another. In other cases, some software modules may be bundled into a single physical or logical software module. Other configurations are possible.

AV control software 208 may include the primary logic for operating the AV. In the case that AV is fully autonomous (e.g., "L4" or higher, as defined by the society of automotive engineer (SAE)), AV control software 208 may have full control of the vehicle. In that case, a passenger or occupant of the vehicle may have no access to controls such as the accelerator or steering wheel. The system may be, for example, a ridehail vehicle service, or a privately owned vehicle that is self-driving.

AV control software 208 receives data, for example, from speakers 230, cameras 236, 240, and other sensors as illustrated in FIG. 1. AV control software 208 may use AI, such as a deep learning (DL) model 224 to make control decisions for the AV. A single DL model 224 is illustrated in this figure, but in many embodiments multiple DL models are provided, and provide different functionality. In some cases, DL models 224 may be provided to enable not only the core AV control functionality, but to provide support functions such as those provided by onboard assistant 212.

AV controller 200 may also include a user interface 210. User interface 210 may be used, for example, to drive touchscreen 246, or to provide other interactions for a user, occupant, or passenger of the vehicle.

I/O drivers 220 may provide a software stack that enables communication between software modules 202 and various hardware elements such as those illustrated for AV controller 200.

A network stack 216 may be provided to communicatively couple AV controller 200 to an external network such as the internet, an intranet, or some other data communication network. Network stack 216 may communicate via digital data transceiver 248. Network stack 216 may also provide services for cellular transceiver 244.

AV controller 200 may include an onboard assistant 212. Onboard assistant 212 provides features that are useful to the passenger of the AV. Onboard assistant 212 may monitor for conditions that may trigger a session between the AV and a service agent. Onboard assistant 212 may be a client application that communicates with an AV operator to allow the passenger to interact with the service agent. The client application may establish a connection between the AV and the service agent when a session is triggered. The client application may transmit information such as sensor data or state of the user interface 210 from the AV controller 200, to the AV operator for facilitating the interaction with the service agent.

AV controller 200 may include an emergency response module 228. Emergency response module 228 may handle a special case or subset of the functions of onboard assistant 212. Emergency response module 228 may specifically be concerned with handling emergency conditions, such as a collision, mechanical failure, or other condition that poses a danger to the occupant or to the vehicle or both. Emergency response module 228 may be a client application that communicates with an AV operator or emergency services to handle such emergency conditions.

AV controller 200 may also include a natural language processing (NLP) engine 222, which may be used to understand verbal commands, queries, and other interactions with the passenger. For example, if the passenger speaks within the cabin of the AV, then microphones 232 may pick up the voice, and NLP engine 222 may use machine learning (such as DL model 224) to transcribe the spoken word. NLP engine 222 may also use a machine learning model to attempt to understand what the passenger has said and formulate a response.

Text-to-speech engine 226 may translate the response into human perceptible speech patterns, which may be driven to speakers 230. Text-to-speech provides real-time direct interaction between the passenger and the AV.

Exemplary System Involving a Fleet of AVs

Figure 3:
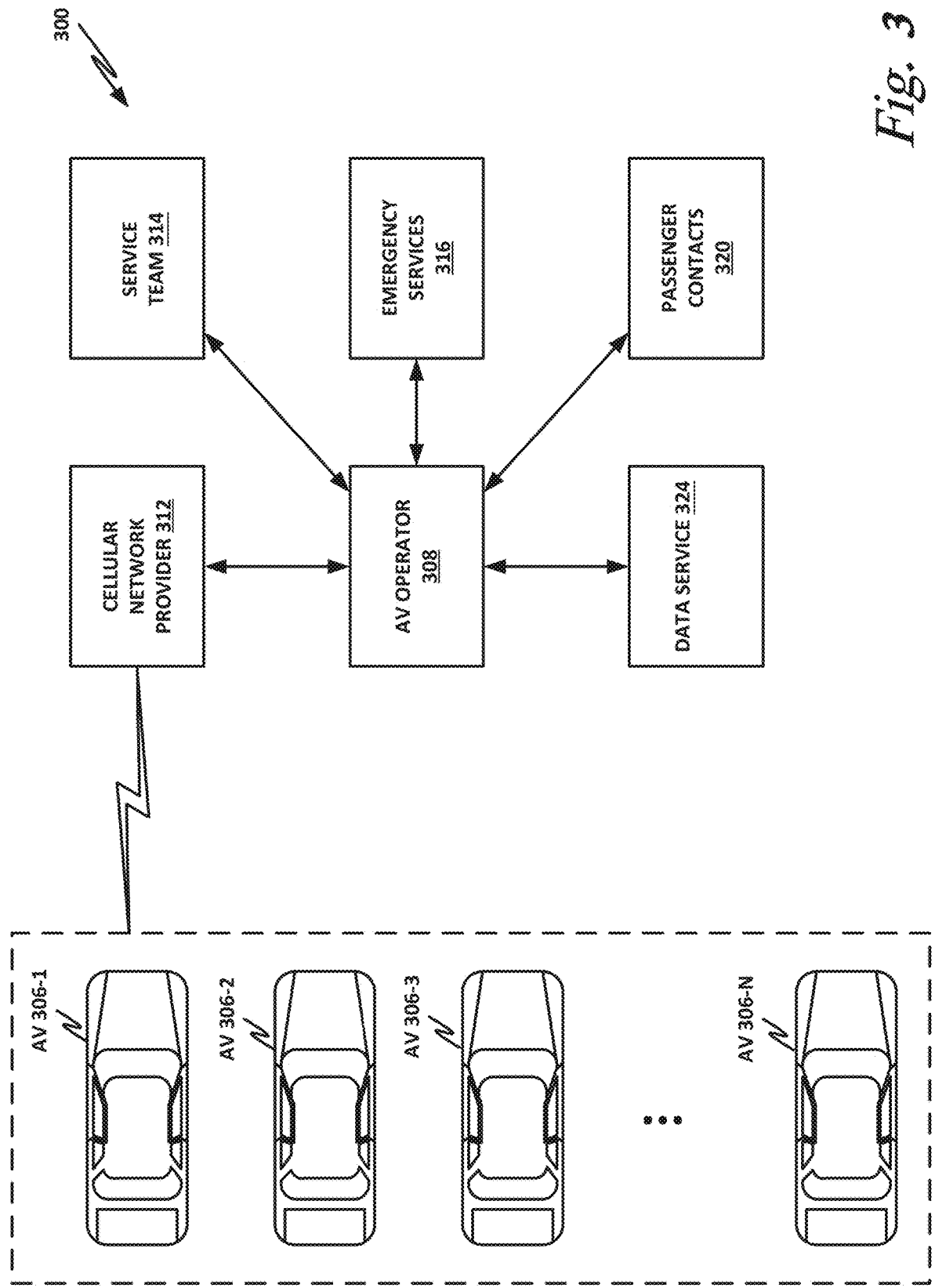
FIG. 3 is a block diagram illustration of selected elements of an AV system.

FIG. 3 is a block diagram illustration of selected elements of a system 300 involving a fleet of AVs. In this illustration, AV operator 308 may operate and include a fleet of AVs 306 and the infrastructure that manages and supports the fleet of AVs. Namely, illustrated here are AVs 306-1, 306-2, 306-3, through 306-N. AV operator 308 may include data centers, computer resources, electronic intelligence, and human operators including human service representatives or service agents. Human service representatives may have a user interface on which they may view AVs 306 within the fleet, including their GPS location, speed, destination, number of passengers, and other information. The user interface may be, for example, a graphical user interface (GUI), web interface, command-line interface (CLI), textual user interface (TUI), virtual reality (VR) interface, augmented reality (AR) interface, or other.

In some cases, and AV 306 (or rider of AV 306) may encounter an event or special condition that triggers a response by an onboard assistant, such as onboard assistant 212 of FIG. 2. Triggering events may include emergency or non-emergency events. For example, a triggering event that activates the onboard assistant may include a passenger pressing a hardware or software button, which initiates a call with the AV operator. In another example, a user asks a simple question which does not require further intervention from a service agent. In that case, the onboard assistant may autonomously answer the question and the interaction may stay local within the AV 306.

In cases where further intervention is required, AVs 306 may place a call or establish a communication session, e.g., via cellular network provider 312, to AV operator 308. Cellular network provider 312 may then provide a voice, video, or multi-media link between the AV 306, the passenger, and AV operator 308. In some cases, the call is initially placed as a conference call with the AV operator 308 in control of the conference call. The use of a conference call may enable AV operator 308 to manage the call, to add or remove parties as necessary, and to otherwise maintain contact with AV 306 and the passenger without interruption. In some cases, establishing the call as a conference call initially means that the passenger need not be placed on hold if AV operator 308 needs to involve other parties. For example, AV operator 308 may connect to a service team 314. The team could be an internal service team, or an outside service contractor. Service team 314 may help to resolve complaints, concerns, feedback (positive or negative), questions, or other service issues.

In some cases, a data service 324 may provide information to AV operator 308 and/or service team 314. For example, the passenger may book a ride with a ridehail vehicle via a ridehail application. The application may include a user account, wherein the rider opts to provide to provide and share certain information with AV operator 308. Information could include personally identifying information (PII) about the passenger, a phonebook of contacts, an emergency contact, user preferences, common routes and destinations, or similar. AV operator 308 may share information from data service 324 according to the terms of a license agreement, and according to a present need. For example, if service team 314 needs information from data service 324, then AV operator 308 may provide the information to service team 314.

In the case of an emergency, it may be desirable to provide other connections. For example, AV operator 308 may communicate with emergency services 316 to dispatch emergency crews to a current location of AV 306 to assess the situation and to provide aid to the passenger as necessary. AV operator 308 may cooperate with emergency response module 228 of FIG. 2 to provide information to emergency services 316 to facilitate dispatch of emergency crews or other emergency services. In some cases, data service 324 may include a list of known passenger contacts 320, or the passenger may use a mobile device such as a cell phone to share emergency contact with the onboard assistant. In the case of an emergency, AV operator 308 may contact an emergency contact on behalf of the passenger.

In other examples, the passenger may simply wish to place a call to one of his or her contacts, in which case AV operator 308 may connect the call and then, if appropriate, remove itself from the call so that there is a direct communication between the passenger and the passenger contact. In the same or a different embodiment, the onboard assistant may connect the passenger directly to a contact, without including AV operator 308.

As described above, the onboard assistant need not provide strictly emergency services. For example, data service 324 could also include a provider of games, movies, music, or other entertainment. AV operator 308 may stream entertainment content to an AV 306 via cellular network provider 312 or some other communication network.

In the same or a different embodiment, data service 324 may also provide useful information such as weather reports, traffic reports, breaking news, incident reports, or other. For example, the onboard assistant may use information from data service 324 to determine that adverse weather has made the planned route less desirable. As an illustration, the data service 324 may report a flash flood watch or flash flood warning, and the onboard assistant may determine that the planned route includes low water crossings. In that case, the onboard assistant may reroute to provide a better trip experience. The data service 324 may also provide information that could similarly be used to reroute to avoid construction, traffic, congestion, adverse conditions (e.g., civil unrest, a structural fire, a dangerous gas leak, etc.), or other conditions that affect the safety and/or desirability of the planned route.

AV operator 308 may also provide advice to the passenger in the event of other non-emergency situations that may nevertheless be stressful or uncomfortable. For example, if a police officer pulls over the ridehail vehicle, AV operator 308 may establish a call with an AV 306 via the onboard assistant, and help the passenger to remain calm, answer questions for the passenger, or assist the passenger in interacting with the law enforcement official.

Other illustrative functions of an onboard assistant may be seen throughout this specification.

Exemplary Method of Providing Onboard Assistance to a Passenger of an AV

Figure 4:
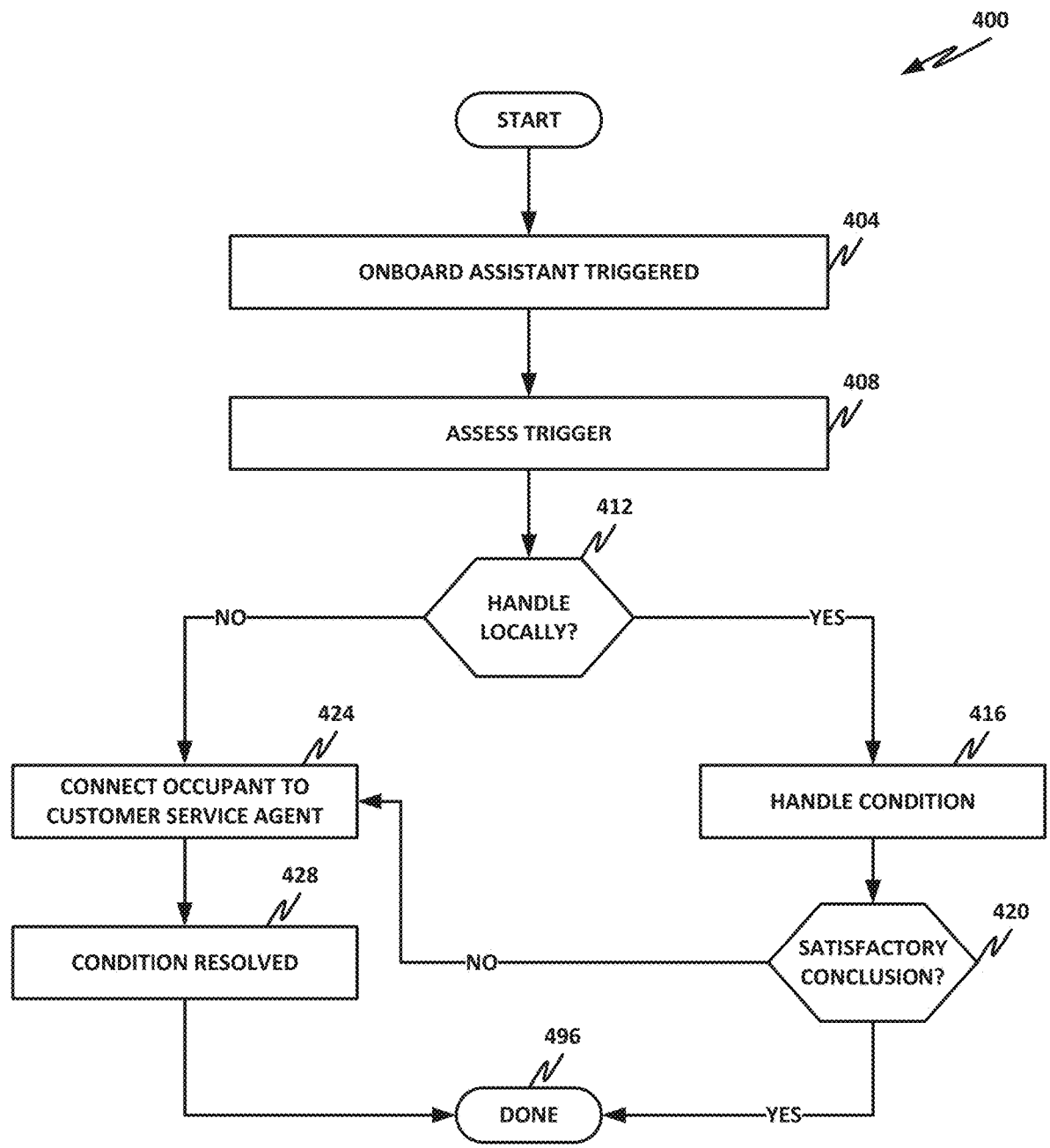
FIG. 4 is a flowchart of a method of providing onboard assistance to a passenger oven AV.

FIG. 4 is a flowchart of method 400 of providing onboard assistance to a passenger of an AV.

In block 404, an appropriate event, often referred to herein as a service incident, triggers the onboard assistant (e.g., onboard assistant 212 of FIG. 2). As discussed above, this could be an emergency or non-emergency event. For example, this may include a button push by the passenger, an accident, a law enforcement interaction, hazardous weather, civil unrest, a hazard, a service complaint, problematic behavior by the passenger, or other event.

In block 408, the onboard assistant may assess the trigger to determine the appropriate response. In particular, the onboard assistant may determine whether the incident is to be handled locally (e.g., by the AV controller 200 and/or onboard assistant 212 of FIG. 2) or remotely (e.g., by the AV operator 308 and/or service team 314 of FIG. 3). In some cases, although not illustrated in FIG. 4, an incident can be handled locally and remotely in combination.

In decision block 412, the onboard assistant decides whether to handle the interaction locally, according to the assessment of block 408. If the interaction is to be handled locally, then in block 416, the AV controller handles the interaction, which may include, for example, handling a user request to stream entertainment services, answering questions from the user, determining that the user has asked to be let out of the AV early, or performing some other function that the AV controller may handle on its own without outside intervention.

In decision block 420, the AV controller determines whether there was a satisfactory conclusion to the onboard assistance trigger, or whether additional action is necessary. If the interaction was successfully handled, then in block 496 the method is done.

Returning to decision block 420, if there was not a satisfactory conclusion, and if it is necessary to involve an outside agent, then control may pass to block 424.

Returning to decision block 412, if the interaction cannot be handled locally, then control passes to block 424. Within block 424, either because the AV controller initially decided not to handle the interaction locally, or because the AV controller was unable to satisfactorily conclude the interaction, the AV controller may communicatively couple to the AV operator, for example, to customer service or rider service. Connecting to rider service may enable the occupant to talk with a human rider support agent, or to interact with a device that has more capability than the onboard AV controller. Such a device may include a service agent, or some other agent of the AV operator. In some cases, this may also include connecting to emergency services or other third parties, to ensure that the user receives timely assistance in the event of an emergency or non-emergency condition.

In block 428, the condition is resolved with the intervention of appropriate human or other actors.

In block 496, the method is done.

Exemplary Method of Filtering and Transforming Sensor and State Logs to Facilitate Handling of a Service Incident Triaging and routing service incidents efficiently is not trivial. When there is a large fleet of vehicles, addressing a variety of service incidents effectively can be a challenge, when different service incidents warrants and can benefit from different types of service agents and different standard operating procedures. Efficiency in handling service incidents can be important because the level of satisfaction of a rider depend largely on how quickly a service incident is resolved. Efficiency in handling service incidents is also important from the operations standpoint to ensure that service incident response resources are spent effectively. Routing a service incident to an inappropriate service agent can waste time and resources. AV sensor data, such as sensor logs and state logs of the AV, can be voluminous and cryptic to the point that humans cannot process quickly or make sense of the data at all. Some AV sensor data (e.g., radar data, numerical digital sensor readings) may also be difficult for humans to comprehend or analyze quickly to enable efficient triaging and routing of service incidents. To address some of these issues, data science and machine learning methods can be used at one or more different points of the service incident handling process. In some instances, data science and machine learning methods can be applied at either the filter/transformation stage or at the expert engine. In some instances, data science and machine learning methods can be applied at the filter/transformation stage and separately at the expert engine. In some instances, one model combining both models can be implemented, e.g., the model can be a deep neural network that can perform filter/transformation of data and prediction/decision/recommendation.

Figure 5:
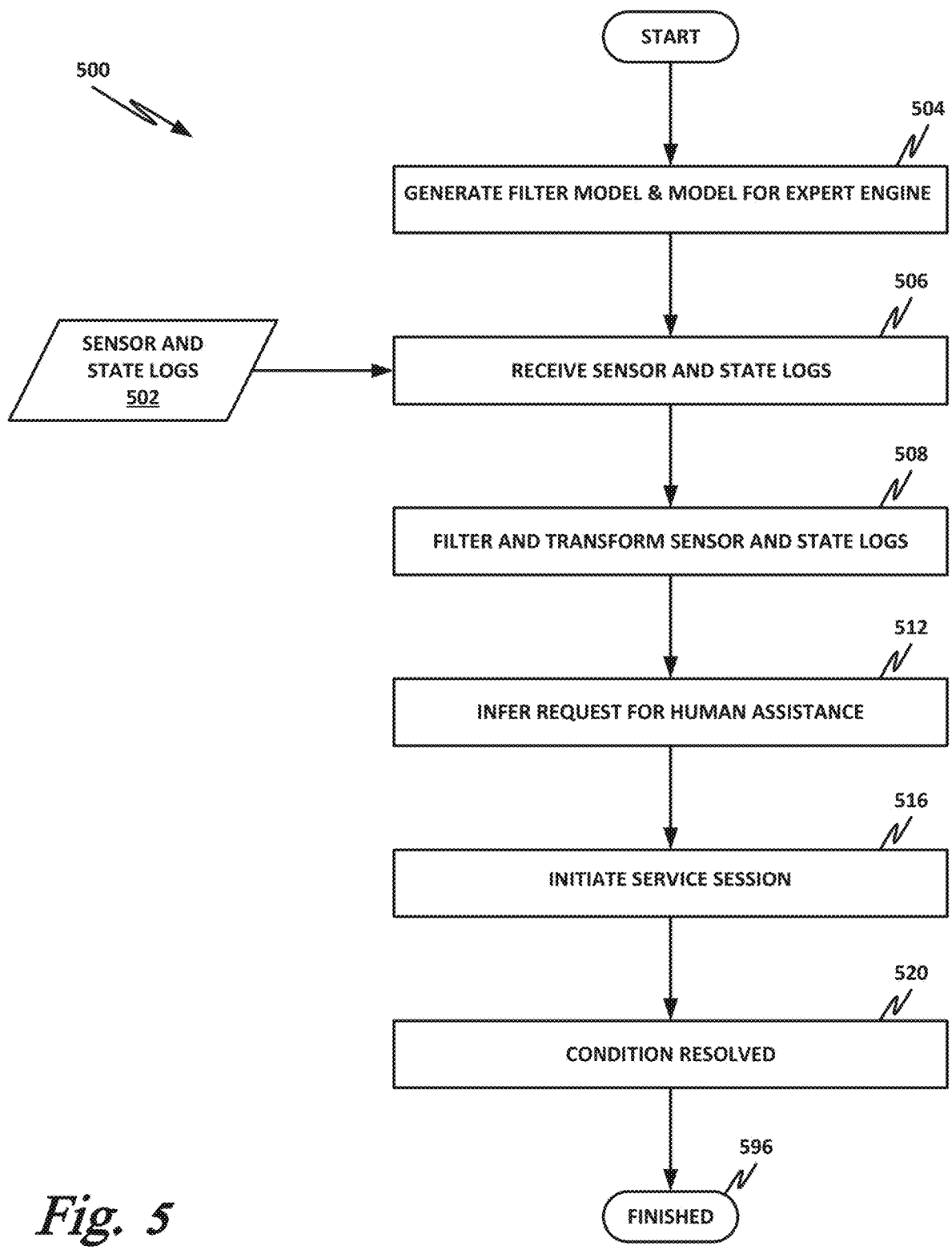
FIG. 5 is a flowchart of a method of handling a rider service incident within an AV.

FIG. 5 is a flowchart of a method 500 of handling a service incident within an AV. For example, the vehicle may be an AV or a semi-autonomous vehicle. In the case of an AV, the AV may be a ridehail vehicle.

In block 504, an AV operator (e.g., AV operator 308 of FIG. 3) may generate a filter model using data science and machine learning methods, where the filter model can appropriately filter and transform sensor inputs to provide useful and meaningful inferences about a state of the vehicle. An AV operator may generate a model for an expert engine that can be used to appropriately route a service incident to the appropriate service agent or apply the appropriate standard operating procedures.

Generating the filter model may include, for example, training the model on labeled real or simulated sensor data, such as real or simulated sensor data, with or without labels (e.g., classes of different states of the AV). In some cases, the process of training the filter model can yield filter thresholds, sensitivities, or other values that can be used in the filter model to deduce the state of the vehicle. In some cases, the trained model can yield classes representing different states of the vehicle. In some cases, the trained model can yield outputs that indicate the state of the vehicle. In some cases, the trained model can indicate whether a special condition exists (e.g., an emergency situation or non-emergency situation).

Generating the model for the expert engine may include, for example, training the model on labeled real or simulated sensor data, such as real or simulated sensor data, with or without labels (e.g., predictions/decisions/recommendations). In some cases, the trained model can take sensor data or a derivation of the sensor data as input and yield predictions/decisions/recommendations for handling a specific service incident.

In block 506, the onboard assistant (e.g., onboard assistant 212 of FIG. 2), and/or AV operator (e.g., AV operator 308 of FIG. 3) receives sensor and state logs 502, e.g., from an AV controller. In some cases, the onboard assistant may provide decisions based on (transformed) sensor and state logs.

In some cases, receiving sensor data may include receiving state logs for the vehicle. State logs may track the states of state machines within the AV controller. The status of the state machines may be used to infer operational conditions. A state log may include historical states for state machines within the AV. Sensor data may also include sensor logs for the vehicle. Logs may include stored values for a plurality of sensors, which may be useful in tracking trends of data or instrumentation over time.

In some cases, the sensor data may also include sensor logs for the vehicle. Logs may include a number of stored values for a plurality of sensors, which may be useful in tracking trends of data or instrumentation over time. the sensor data may also include trip information for planned or ongoing trip of the vehicle. The sensor data may also comprise current location information for the vehicle along with other information, such as speed and direction. The sensor data may also include data from a collision sensor. For example, the sensor data may inform the AV controller if the vehicle has been in a collision. The sensor data may also include an environmental sensor, which may sense environmental conditions such as low light conditions, fog, rain, snow, wind, or other environmental conditions that may affect operation of the vehicle. The sensor data may also comprise a tire pressure sensor, which may be used, for example, to determine that the vehicle has encountered a flat tire without requiring a human service operator to physically check the vehicle. The sensor data may also include data about external obstructions or obstacles. These could include roadblocks, stopped cars, accidents, protests, hazards, fires, or other obstructions that may affect operation of the vehicle. Such obstructions may require the vehicle to reroute or to stop, and in those cases, it may be useful to connect the passenger with a service agent to help resolve any concerns.

In some cases, the sensor data may include information from service session(s) associated with the vehicle. For example, if a previous service session exists for the vehicle, then appropriate (historical) information may be provided from the previous service session and may help the onboard assistant to make decisions about the current special condition. Historical information from service session(s) associated with the vehicle can include historical sensor data that triggered the previous service session(s), historical rider sentiment data associated with the previous service session(s), and resolution or steps executed to resolve the previous service session(s).

In some cases, the sensor data may include sensor data which indicates rider sentiment. Sensor data that may indicate rider sentiment includes sensor data relating to vital signs monitoring, video data of the cabin, audio data of the cabin, rider profile data, seat occupancy sensor data, seat temperature sensor data, etc.

In block 508, the onboard assistant (e.g., onboard assistant 212 of FIG. 2), and/or AV operator (e.g., AV operator 308 of FIG. 3) may filter and transform sensor and state logs, e.g., using the trained model, to provide inferences for the state of the AV. In some cases, filtered/transformed sensor and state logs are generated in block 508. An onboard assistant for the AV may filter the sensor data before transforming the sensor data. For example, filtering may include removing unnecessary data points, removing unnecessary values, combining data, or otherwise conditioning the data. The transforming of the sensor data may include generating inferences about the state of the AV, or determine whether the sensor data indicates a special condition.

In some embodiments, data science and machine learning methods can be applied, in block 504, to generate a filter/transformation model to filter/transform AV sensor data, in block 508, into data which can be used readily for routing to different service agents or different standard operating procedures. Preferably, the transformed data can provide inferences or insights into the state of the AV (and even the rider) in ways that a human cannot. For instance, the transformed data include a summary or digest of possible issue(s) of the AV and/or the rider. In another instance, the transformed data include flag(s) of certain sensor data as being anomalous or needs attention. In yet another instance, the transformed data can include one or more probabilities that the AV is in one or more defined states. In yet another instance, the transformed data includes a reduced or condensed set of sensor data, removing any data that is not suggestive or determinate of a possible issue. In yet another instance, the transformed data includes a feature vector representing values of salient features of the AV sensor data.

The filter/transformation model can be a supervised model, where training of the model is performed using labeled data. The filter/transformation model can be unsupervised, where training of the model is performed without labeled data. In many circumstances, such a model can often detect and extract salient information from AV sensor in ways that human cannot. Examples of data science and machine learning methods applicable for transforming data includes: neural networks, convolutional neural networks, support vector machines, regression, clustering, deep learning, time-series regression analysis, etc.

In block 512, the onboard assistant (e.g., onboard assistant 212 of FIG. 2), and/or AV operator (e.g., AV operator 308 of FIG. 3) may infer, based on sensor logs, filtered/transformed sensor and state logs, rider sentiment, and/or other data, that the passenger has expressly requested assistance. Alternatively, the onboard assistant (e.g., onboard assistant 212 of FIG. 2), and/or AV operator (e.g., AV operator 308 of FIG. 3) may infer contextually that the passenger requires assistance. In some cases, the passenger may not be able to expressly ask for assistance, such as in the case of the passenger experiencing a medical emergency wherein the passenger loses consciousness or has difficulty speaking. In such cases, it may be beneficial for the AV controller to place an automated call to a service agent, who may help the passenger without an explicit request.

In block 516, the AV operator (e.g., AV operator 308 of FIG. 3) may contact a service organization (e.g., service team 314 of FIG. 314) and initiate a service session to provide the necessary help for the passenger, so as to implement a standard operating procedure suitable for a given service incident. Interactions may range from asking questions, filing complaints, and modifying services to interacting with emergency personnel, handling a law enforcement interaction, or handling a serious accident or collision.

In some cases, the onboard assistant (e.g., onboard assistant 212 of FIG. 2), and/or AV operator (e.g., AV operator 308 of FIG. 3) may infer that a special condition for the vehicle requires intervention, either from the AV controller or from an outside human user. The onboard assistant (e.g., onboard assistant 212 of FIG. 2) optionally receives instructions (e.g., suitable standard operating procedures) for handling the special condition in accordance with the service session.

In cases where external service support is needed, initiating a service session may include contacting a service representative and placing an occupant of the vehicle in a call with the service representative. Processes running in the service center may display to the service representative contextual information about the special condition, the vehicle, and/or the passenger as appropriate to the circumstances. The service software may also display to the service representative a copy of a user interface being displayed to the occupant of the vehicle. To further assist the service agent, the software may display contextual hints for resolving the special condition, such as which services to dispatch and how to respond to the passenger. This may increase the passenger's ease and address difficulties the passenger may have encountered from the special condition. In some cases, the service software may also display contextual hints for interacting with the passenger. The contextual hints may include information about an inferred rider sentiment.

In some embodiments, data science and machine learning methods can be applied to generate a model for an expert engine, in block 504, to take the transformed data as input and output a service agent that is best matched for a given service incident, or a suitable standard operating procedure for handling the given service incident, thereby carrying out at least some of the functionalities of the onboard assistant and/or the AV operator. For instance, the expert engine, with the assistance of the model generated in block 504, can carry out the functionalities in blocks 512 and/or 516. The model can be implemented to take an input vector having predefined features that are most relevant for service incidents. The input vector can include transformed sensor data, e.g., having one or more of the following: collision sensor data, tire pressure sensor data, battery state data, camera data, audio data, rider data, rider sentiment, historical rider data, historical AV data, LIDAR data, RADAR data, weather data, traffic data, gas sensor detector, trip information, AV state classification, etc. The outputs of the model can be predefined to include the types of service agent agents and different standard operating procedures available at the AV operator. Accordingly, the model can process the input vector data and output a prediction, decision, or recommendation (e.g., optimal choice of service agent or selection of standard operating procedures) for how to handle the service incident. Various scores can be generated at the outputs of the model, where the highest score may correspond to the most suitable service agent or standard operating procedure.

The model for the expert engine can be unsupervised, where training of the model is performed without labeled data. In many circumstances, such a model can often consider salient information from AV sensor data for prediction and decision making in ways that human cannot. Examples of data science and machine learning methods applicable for the expert engine includes: neural networks, convolutional neural networks, support vector machines, deep learning, decision trees, multi-output logistic regression, etc.

The model for the expert engine can generate outputs dynamically as the model receives new information, the output vector may change, which may lead to a rerouting of the service incident to a different service agent or a change in the standard operating procedures in resolving the service incident.

In block 520, either with or without outside assistance (e.g., with a service representative), the onboard assistant may resolve the condition to the satisfaction of the parties, e.g., by implementing at least a part of a standard operating procedure that is suited to handle the service incident.

Once the condition is resolved, in block 596, the method is done.

Exemplary System Implementing an Onboard Assistance Function

Figure 6:
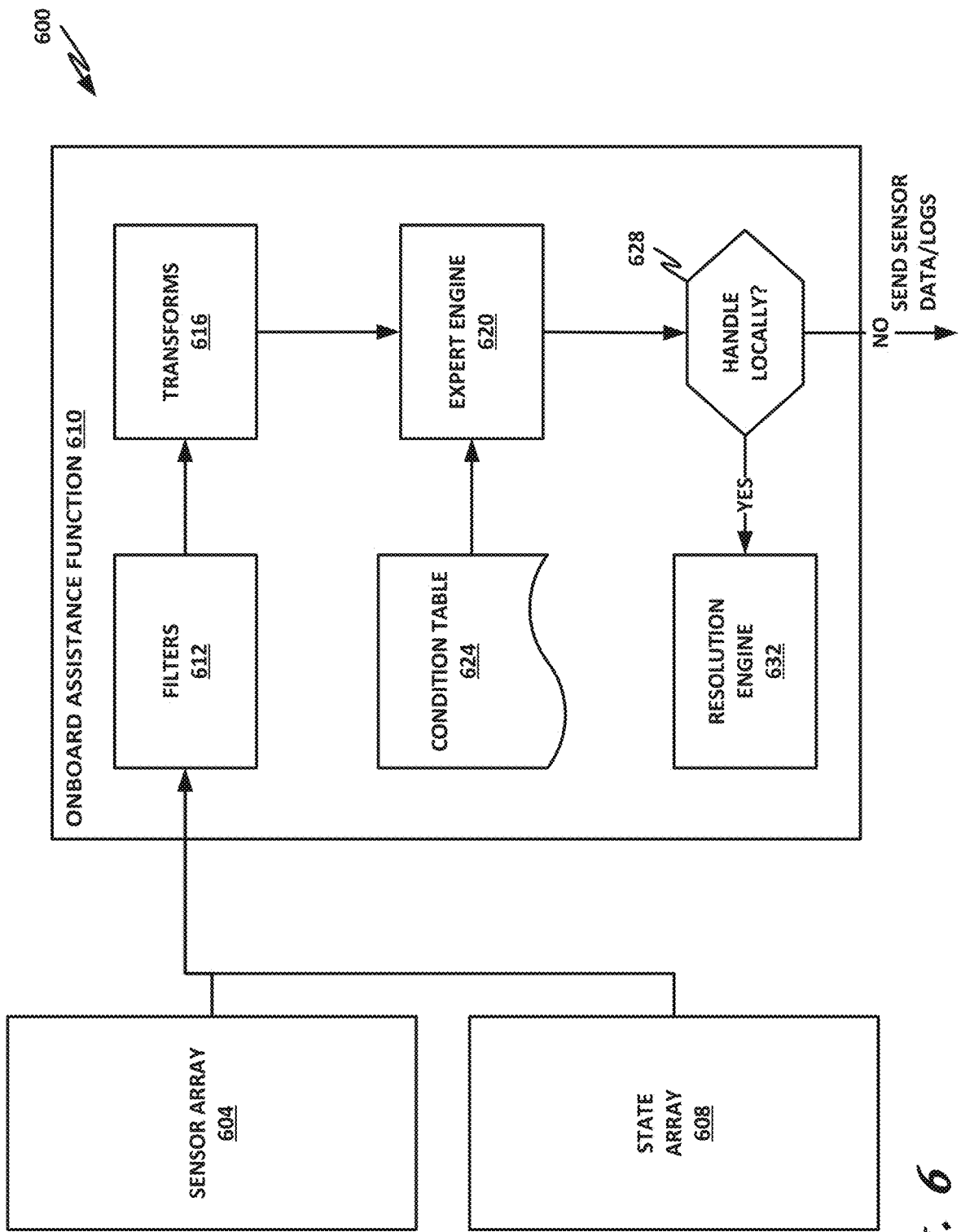
FIG. 6 is a block diagram of a computer system that illustrates operation of an onboard assistance function.

FIG. 6 is a block diagram of a computer system 600 that illustrates operation of an onboard assistance function. In this case, onboard assistance function 610 receives data from a sensor array 604 and a state array 608. For instance, state array 608 may provide states of state machines that operate within an AV controller while sensor array 604 may provide sensor data from a number of sensors across the AV. Sensor data and state data may be provided in real-time or as a historical chart of values that may be used to evaluate a particular situation. Computer system 600 may be provided locally on the AV. In some other cases, computer system 600 may be provided remotely at the AV operator. In some other cases, computer system 600 includes portion(s) provided locally on the AV and portion(s) provided remotely at the AV operator.

Onboard assistance function 610 includes one or more filters 612 that filter and/or condition the data to prepare it for further operation.

Transforms 616 may then be applied to transform the data into useful and meaningful inferences of the state of the AV and the passenger. In some cases, the transforms 616 may be implemented by a data science technique or a machine learning algorithm, which may have been trained previously with data and corresponding inferences of the state of the AV.

An expert engine 620 receives the transformed data from transforms 616 and may use a table or other logic, such as a condition table 624, to determine what the current special condition is and an appropriate response to the current special condition. In some cases, the expert engine 620 implements a data science technique or a machine learning algorithm that takes the transformed data as input to infer or predict the current special condition and/or appropriate next steps to address the current special condition. In some cases, the expert engine 620 implements a machine learning algorithm that takes the transformed data as input to generate a suitable resolution to the current special condition.

In decision block 628, the AV controller determines whether the special condition is one that may be handled locally and autonomously by the AV controller. In the case of a condition that may be handled locally, resolution engine 632 (e.g., implemented in an onboard assistant on an AV) may respond to the special condition and provide a resolution.

If the special condition is one that cannot or should not be resolved locally, then the AV controller may instead open a service session (if one has not yet been opened already) and connect the rider in the AV to a service agent or the AV operator.

While not illustrated in FIG. 6, the expert engine 620 may dynamically change the output if new information is provided as input to the expert engine 620 or new entries in the condition table 624 are available.

Exemplary Modes for Responding to a Special Condition

Embodiments herein recognized at least three illustrative service modes or modes (e.g., different severity modes) for assessing and responding to a special condition. Additional modes, with additional granularity, may also be provided. These modes may correspond to different standard operating procedures or different service agents. In some cases, a model of the expert engine may output a selection of a mode that best matches a given special condition or sensor data input vector.

Generally speaking, different levels or types of service agents may be associated with different service modes. Generally speaking, standard (e.g., non-expert) service agents may be qualified and permitted to handle recoverable incidents, such as a case where a cabin control is not working properly. For example, if the radio volume stops responding, the service agent may contact the passenger, assure him or her that the AV continues to operate safely, and optionally instruct the passenger in how to turn off the radio or take other corrective action. Optionally, the service agent may have override abilities to override certain cabin controls, such as to turn off the radio, override the volume, change climate control settings, roll up or down windows, or some other control. In some cases, a problem may be such that a standard service agent is unable to handle the situation or does have necessary access. This may be any situation deemed to be of sufficient seriousness, and in a specific example may include non-recoverable situations. A non-recoverable situation may be an instance where the AV is not able to continue or complete its planned route. This may include, for example, a flat tire, a collision, a mechanical failure, or similar situation. A serious condition may also be external to the AV, such as adverse weather, adverse social conditions (e.g., social unrest or criminal incident), accidents that congest roadways, crimes in progress, or similar. Because the AV cannot recover, simply taking and logging an action may be insufficient. Rather, the incident may be referred to an expert service agent. Expert service agents may have greater training and access. In an example, the expert agent may have authority to assume control of the AV and provide it with remote directives (e.g., vehicle control directives), such as to terminate its trip, reroute, change cabin controls, or others. The expert service agent may also, for example, dispatch a towing service to retrieve the vehicle, interact with emergency services, such as police or emergency medical services, interact with the human passenger to provide support, instructions, or assistance, or perform any other necessary tasks to resolve the incident.

In a lowest level of severity (e.g., "Mode 1"), the local AV controller and/or onboard assistant can handle the instance without outside intervention. This may include, for example, a simple request from the passenger, such as "How far to the destination?", "What is our current location?", "What is the weather at my destination?", or a request to change cabin controls, such as adjusting the radio, changing the cabin temperature. A very straightforward request like this may be handled by the AV onboard assistant, particularly if it includes a NLP engine that can parse and respond to requests. Depending on the technology, the onboard AV controller may also be able to handle and log events such as computing and executing minor course deviations (e.g., to avoid a road closure, follow a detour, or similar), advising the passenger of minor deviations, minor damage to the vehicle (especially cosmetic damage or damage that does not inhibit operation), or other events that the onboard controller and/or onboard assistant are competent to handle. In at least some embodiments, a Mode 1 incident may not result in opening a service session with a remote service agent. Rather, the service agent role is fulfilled by the local AV controller and/or onboard assistant.

In an example intermediate mode (e.g., "Mode 2"), the AV controller or onboard assistant may not be competent to handle the request autonomously, and may refer the even to a service team, where the event can be handled by a human operator, or by a machine with more available compute resources. This mode may include explicit requests from the human passenger to contact the service team (e.g., via the onboard button). This mode may also include events that require additional input from a central data source. For example, if the passenger requests a change in destination mid-trip, it may be a desirable to service the request when possible. But the onboard controller may need additional centralized information, such as verifying that the AV is not previously booked for a different trip, looking up updated fare and distance information, and verifying that the destination is legitimate. Mode 2 may also include events such as minor collisions, flat tires, route disruptions, or similar, that can be handled by a standard service agent. In some examples, Mode 2 may also include more severe events like a serious collision, if regular service agents are properly trained to handle the situation. In at least some cases, a Mode 2 incident may result in opening n standard service session with a service agent, and the service agent role is fulfilled by a standard service agent.

In an example elevated mode ("Mode 3"), the incident is more serious or difficult, and is referred to a service expert. In this case, the role of service agent may be fulfilled by the service experts. This expert may have elevated privileges within the system and may have additional training to handle special situations. For example, the service expert may have training to handle serious accidents, including accidents that involve injuries to passengers, pedestrians, or occupants of another vehicle. The service expert may also have privileges to take control of the AV or one or more subsystems of the AV, alter the route of the AV, or otherwise direct its action.

In an example, an incident may initially be designated as Mode 2, and provided to a standard service agent. If the service agent is unable to successfully resolve the condition, she or he may elevate the ticked to Mode 3 and refer it to a service experts. In the same or a different embodiment, any condition that debilitates the AV or prevents recovery may automatically be elevated to Mode 3, thus bypassing the standard service center. Such conditions may include, by way of illustrative example, damage to the AV that inhibits operation (e.g., a collision, flat tire, mechanical failure, or similar). In another example, the AV may be unable to determine how to proceed on its route, for example, because of a road closure, road damage, emergency condition such as a fire or accident that blocks the road, natural disaster, severe weather event, or similar. In another example, the AV may be unable to proceed because it encounters an error that inhibits receiving sensor data, such as because a sensor is damaged or inoperable, or a communications path has become unavailable. In another example, the AV controller is unable to proceed because it receives inconsistent or nonsensical sensor data, which may make it unsafe to proceed (e.g., because the unexpected sensor data imply a damaged sensor or sensors).

Exemplary Method of Leveraging Additional Information When Servicing a User in an AV Besides sensor and state logs, other information may be used as part of a service session. Other information may include, but are not limited to: rider sentiment, historical information of the user, user profile information, information from historical service session(s) of the same AV, information from historical service session(s) of the same rider, and information displayed on the user interface of a user device (e.g., what the user is seeing on a user device). The other information may be used for triaging a situation with the AV or the rider in the model(s) described in FIG. 5 (e.g., the filter model). The other information may be used for determining an appropriate recommendation in the model(s) described in FIG. 5 (e.g., the model in the expert engine). In some cases, the other information may be used as contextual hints or information that would assist a service agent to better resolve a service incident.

In some cases, the other information (along with sensor and state logs) can be displayed to a service agent as contextual information or contextual hints to assist the service agent's interaction with the passenger.

In some cases, the other information (along with sensor and state logs) can cause a service session to be routed to different service agents (e.g., service agents having different expertise or levels), or cause different modes of response to the incident.

In some cases, the other information can cause the mode of a service session to change as new information is received, e.g., to provide a dynamic rider service response, during the pendency of a service session. When a mode of a service session changes, different actions to resolve the issue may be taken, and/or different service agents may be deployed to resolve the issue.

In some cases, the AV controller may use a sentiment engine to identify the other information, such as rider sentiment, based on sensor data collected in the AV or on a user device. The sentiment engine and the sensed rider sentiment may help service agents to understand the passenger's level of stress, frustration, anxiety, or other emotions. Based on the rider sentiment and optionally any other contextual information, AV operator can adjust or personalize the service experience for the passenger by tailoring instructions given to a service agent. For example, the AV operator may generate recommendations for responses that the service agent may use to help personalize the experience and respond in an empathetic and helpful manner. For example, if the vehicle sensors detect that the car has been in a collision and a certain rider sentiment has been detected, the service console may generate and display suggested phraseology and information that the service agent may provide or say to help ease the passenger having that specific detected rider sentiment.

Figure 7:
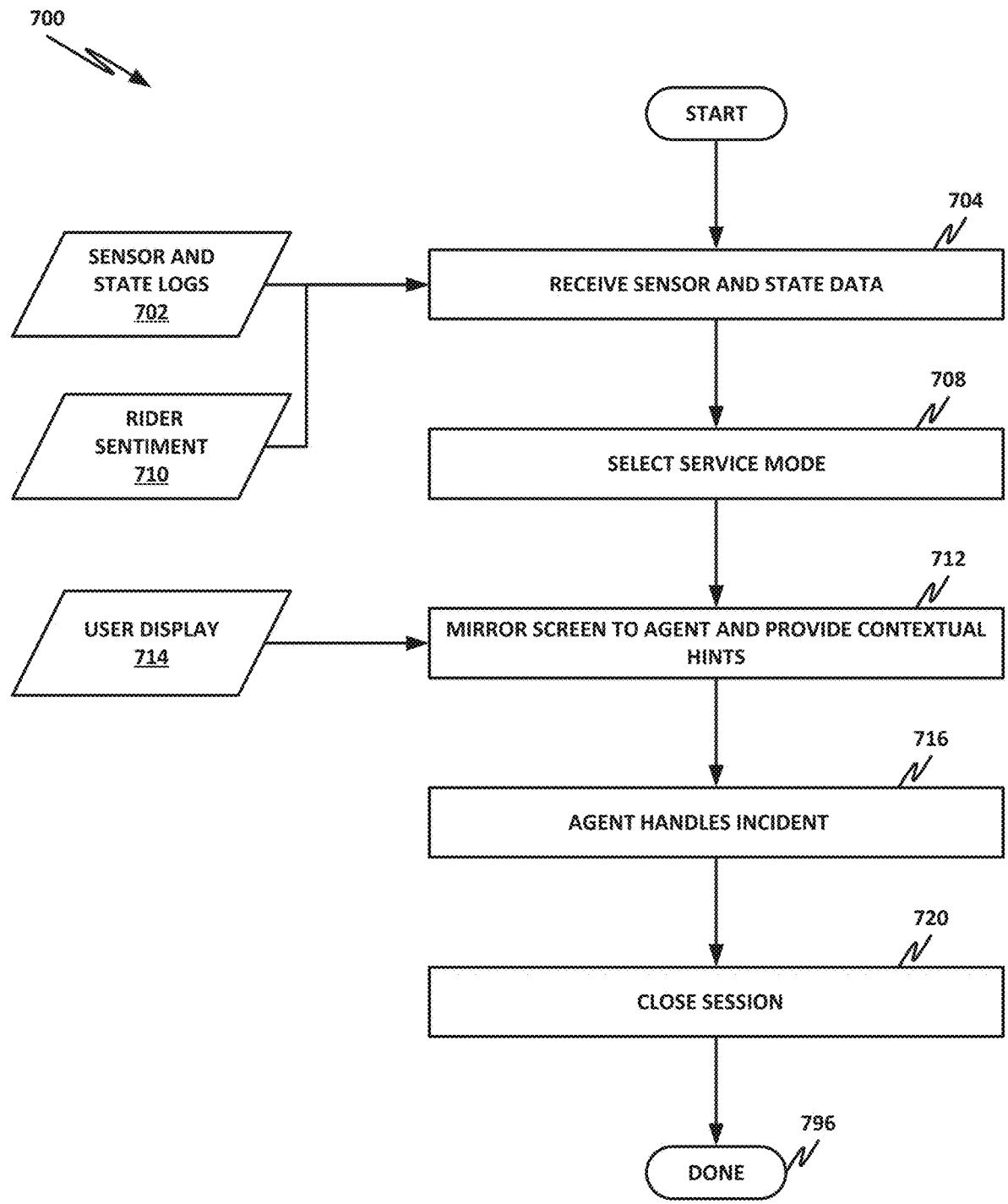
FIG. 7 is a flowchart of a method of providing rider service within the AV context.

FIG. 7 is a flowchart of a method 700 of providing rider service within the AV context.

In block 704, the onboard assistant (e.g., onboard assistant 212 of FIG. 2), and/or AV operator (e.g., AV operator 308 of FIG. 3) may receive sensor and state logs 702. An inferred or detected rider sentiment 710 may also be provided, which may assist the onboard assistant and/or AV operator in determining how best to handle the incident. The sensor and state logs may include present and/or near-present sensor data, along with historical data, as necessary.

In block 708, the onboard assistant (e.g., onboard assistant 212 of FIG. 2), and/or AV operator (e.g., AV operator 308 of FIG. 3) may assign an initial service mode to the incident, based on the sensor data and state logs. The initial service mode may change over the course of the incident, for example, if the service agent determines that the severity of the incident needs to be elevated. In another example, the initial service mode may change when the rider sentiment 710 suggests that the severity of the incident needs to be elevated.

In making the initial mode assignment, the onboard assistant may first determine whether the incident or request can be handled locally. For example, the onboard assistant may handle a simple request for information that is locally available. Similarly, the onboard assistant may handle, and optionally log, minor incidents, such as a malfunctioning sensor that is not safety-critical, or an incident such as reminding the passenger of a rule (e.g., "Reminder: please clean the vehicle before exiting the vehicle. This helps us keep the vehicle tidy for the next passenger," or "You seem to have left your purse in the seat. Please take all personal items with you."). In some cases, the onboard assistant may elevate the incident to Mode 2, for intervention by a human service agent.

In other cases, the onboard assistant may determine from the start that the incident warrants Mode 2 or Mode 3 service assistance and involve a human service agent. In these cases, the onboard assistant or the service center may assign a service session to the incident.

Block 712 may be most relevant in the case of a Mode 2 or Mode 3 incident, where a human service agent is involved. In that case, the data center may receive information about user display 714, such as information to mirror the passenger's user display, or to provide the service agent with information that the passenger sees. For example, the service agent's software may mirror the tablet screen to the service agent and provide contextual hints about how to best respond to the current situation. Hints may provide both an optimal resolution as well as a resolution intended to limit the stress, anxiety, or fear experienced by the passenger. These hints may optionally be informed by or include an inferred rider sentiment.

The disclosed system empowers the service agent by showing the agent what the passenger is seeing on the tablet and/or on the passenger's mobile app. Such visibility may help the service agent to tailor his or her response and meet the passenger's needs accordingly. For example, the service agent may assure the passenger that field support is being dispatched, and the service agent may also provide an estimated time of arrival (ETA) and other useful updates. In some cases, the position of a responding service, such as a tow service, an emergency service, or similar may be displayed on the user's tablet so that the passenger may track the response in real-time and know how far away help is. The tablet may also display the ETA, the current position, the speed, and other information, such as traffic or weather conditions. Real-time information may help to ease the passenger's mind in the event of an adverse or special condition that is stressful to the passenger.

Depending on the incident, the system may also skip initial interaction with the human passenger, and instead skip directly to remedial action. For example, in the case of a collision or injury, the system may dispatch emergency or repair personnel without a request from the human passenger.

In block 716, the service agent handles the session according to the provided information. Depending on the mode or the context, the service agent may be the onboard assistant, a standard human service agent, an expert human service agent, or other.

For example, some special incidents can be handled locally by the AV controller or the onboard assistant. In that case, intervention by a human service agent may be unnecessary. The AV controller or the onboard assistant may handle the situation and may optionally log and report the incident and its corrective action.

For other types of incidents, the service center may provide a standard mode, with standard service agents, who have access to functions such as viewing the state of the vehicle, reading sensor data, optionally overriding certain cabin controls, mirroring a view of the onboard tablet interface, or performing other standard service functions.

In block 720, once the situation has been handled, the service agent may close the session (if any) and, as appropriate, allow the passenger to proceed on his or her way.

In block 796, the method is done.

Exemplary Hardware Platform

FIG. 8 is a block diagram of a hardware platform 800. Although a particular configuration is illustrated here, there are many different configurations of hardware platforms, and this embodiment is intended to represent the class of hardware platforms that may provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 800 may provide a suitable structure for controller 104 of FIG. 1, for AV controller 200 of FIG. 2, for carrying out the functionalities and systems illustrated in FIGS. 5-7, as well as for other computing elements illustrated throughout this specification, including elements external to AV 102. Depending on the embodiment, elements of hardware platform 800 may be omitted, and other elements may be included.

Hardware platform 800 is configured to provide a computing device. In various embodiments, a "computing device" may be or comprise, by way of non-limiting example, a computer, system-on-a-chip (SoC), workstation, server, mainframe, virtual machine (whether emulated or on a "bare metal" hypervisor), network appliance, container, a data center, a communications service provider infrastructure, an in-memory computing environment, a computing system of a vehicle (e.g., an automobile or airplane), embedded computer, embedded controller, embedded sensor, smart phone, tablet computer, wearable computer, or any other electronic device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some embodiments they may interconnect with one another.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system (OS) 806, control functions 808, or data 812.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Processors 802 may be any type of processor and may communicatively couple to chipset 816 via, for example, PtP interfaces. Chipset 816 may also exchange data with other elements. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPU).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. Memory 804 may include any form of volatile or nonvolatile memory. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality. In certain embodiments, memory 804 may comprise a relatively low-latency volatile main memory, while storage 850 may comprise a relatively higher-latency nonvolatile memory. However, memory 804 and storage 850 need not be physically separate devices, and in some examples may simply represent a logical separation of function (if there is any separation at all).

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that may coordinate to achieve a logical operation.

Chipset 816 may be in communication with a bus 828 via an interface circuit. Bus 828 may have one or more devices that communicate over it, such as a bus bridge 832, I/O devices 835, accelerators 846, and communication devices 840, by way of non-limiting example. In general terms, the elements of hardware platform 800 may be coupled together in any suitable manner. For example, a bus may couple any of the components together.

Communication devices 840 may broadly include any communication not covered by a network interface and the various I/O devices described herein. Devices may include, serial or parallel devices that provide communications. In a particular example, communication device 840 may be used to stream and/or receive data within a CAN.

I/O devices 835 may be configured to interface with any auxiliary device that connects to hardware platform 800 but that is not necessarily a part of the core architecture of hardware platform 800. A peripheral may be operable to provide extended functionality to hardware platform 800 and may or may not be wholly dependent on hardware platform 800. Peripherals may include input and output devices such as displays, terminals, printers, keyboards, mice, modems, data ports, network controllers, optical media, external storage, sensors, transducers, actuators, controllers, data acquisition buses, cameras, microphones, speakers, or external storage, by way of non-limiting example.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), and/or accelerators 846. In alternative embodiments, any portions of the bus architectures could be implemented with one or more PtP links.

OS 806 may be an embedded or real-time operating system. In some embodiments, a hardware platform 800 may function as a host platform for one or more guest systems that invoke application (e.g., control functions 808).

Control functions 808 may include one or more computing engines that may include one or more non-transitory computer-readable mediums having stored thereon executable instructions operable to instruct a processor to provide operational functions. At an appropriate time, such as upon booting hardware platform 800 or upon a command from OS 806 or a user or security administrator, a processor 802 may retrieve a copy of the operational agent (or software portions thereof) from storage 850 and load it into memory 804. Processor 802 may then iteratively execute the instructions of control functions 808 to provide the desired methods or functions.

There are described throughout this specification various engines, modules, agents, servers, applications, or functions. Each of these may include any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. The engine may also include other hardware, software, and/or data, including configuration files, registry entries, application programming interfaces (APIs), and interactive or user-mode software by way of non-limiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language. These may be used with any compatible operating systems or operating environments. Hardware elements may be designed manually, or with a hardware description language. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Communication devices 840 may communicatively couple hardware platform 800 to a wired or wireless network or fabric. A "network," as used throughout this specification, may include any communicative platform operable to exchange data or information within or between computing devices. A network interface may include one or more physical ports that may couple to a cable (e.g., an Ethernet cable, other cable, or waveguide), or a wireless transceiver.

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all the functions of a physical hardware platform.

In a general sense, any suitably configured processor may execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a SoC architecture or in any other suitable configuration. For example, embodiments disclosed herein may be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Selected Examples

Example 1 includes a method of providing an onboard assistant for a vehicle, comprising: receiving sensor data from sensors of the vehicle; transforming the sensor data using a trained machine learning (machine learning) model to provide transformed sensor data; inferring from the transformed sensor data that a rider service incident has occurred; and resolving the service incident.

Example 2 includes the method of example 1, wherein the vehicle is an autonomous vehicle (AV).

Example 3 includes the method of example 2, wherein the AV is a ridehail vehicle.

Example 4 includes the method of example 1, further comprising filtering the sensor data.

Example 5 includes the method of example 1, wherein receiving the sensor data comprises receiving state logs for the vehicle.

Example 6 includes the method of example 1, wherein receiving the sensor data comprises receiving sensor logs for the vehicle.

Example 7 includes the method of example 1, wherein the sensor data comprise information for a service session associated with the vehicle.

Example 8 includes the method of example 1, wherein the sensor data comprise trip information for a planned trip of the vehicle.

Example 9 includes the method of example 1, wherein the sensor data comprise current location information for the vehicle.

Example 10 includes the method of example 1, wherein the sensor data comprise data from a collision sensor.

Example 11 includes the method of example 1, wherein the sensor data comprise data from an environmental sensor.

Example 12 includes the method of example 1, wherein the sensor data comprise data from a tire pressure sensor.

Example 13 includes the method of example 1, wherein the sensor data comprise data about external obstacles.

Example 14 includes the method of example 1, further comprising: determining a mode for the service incident based on the transformed or untransformed sensor data, wherein the mode is selected from a plurality of discrete service modes and represents a severity of the service incident; and assigning the service incident to a rider service agent according to the mode.

Example 15 includes the method of example 14, further comprising elevating the service incident to a different service agent after determining that the service agent has failed to resolve the service incident.

Example 16 includes the method of example 14, wherein the service agent provides a function, and the function is provided by a local computing device of the vehicle.

Example 17 includes the method of example 16, further comprising determining that the service incident is a request for information that the local computing device is competent to resolve.

Example 18 includes the method of example 14, wherein the service agent provides a function, and the function is provided a human service agent.

Example 19 includes the method of example 18, further comprising placing a passenger of the vehicle in a call with the service agent.

Example 20 includes the method of example 19, further comprising displaying, to the service agent, contextual information about the service incident.

Example 21 includes the method of example 19, further comprising displaying to the service agent a copy of a user interface being displayed to the passenger.

Example 22 includes the method of example 19, further comprising displaying, to the service agent, contextual hints for resolving the service incident.

Example 23 includes the method of example 22, further comprising inferring, based on the sensor data, a sentiment for the passenger, and modifying the contextual hints based on the sentiment.

Example 24 includes the method of example 19, further comprising displaying, to the service agent, contextual hints for interacting with the passenger.

Example 25 includes the method of example 18, wherein the service incident is a law enforcement interaction.

Example 26 includes the method of example 18, wherein the service incident is a recoverable incident.

Example 27 includes the method of example 14, wherein the service agent implements a function, and the function is provided by a human expert service agent.

Example 28 includes the method of example 27, wherein the service incident is a non-recoverable incident.

Example 29 includes the method of example 27, wherein the service incident is a collision or damage to the vehicle.

Example 30 includes the method of example 27, wherein the service incident is a weather incident.

Example 31 includes the method of example 27, wherein the service incident is a social unrest or criminal incident.

Example 32 includes the method of example 27, further comprising receiving vehicle control directives from the service agent.

Example 33 includes a method of provide autonomous control of the AV; receive sensor data from sensors; transform the sensor data into one or more input vectors for a machine learning algorithm; operate the machine learning algorithm to infer, from the sensor data, a service incident for the AV or a passenger of the AV; and assign the service incident to a rider service agent for resolution.

Example 34 the method of Example 38, further comprising: determining a mode for the service incident based on the transformed or untransformed sensor data, wherein the mode is selected from a plurality of discrete service modes and represents a severity of the service incident; and assign the service incident to a rider service agent according to the mode.

Examples 2-32 can be applicable to Examples 33 and 34.

Variations and Implementations

AVs may also be used for many other purposes, including by way of illustrative and non-limiting example, personal vehicles (which may be fully autonomous, or provide hybrid autonomous/driver assist modes), automated cargo vehicles, delivery drones, autonomous trains, autonomous aircraft, or similar. Any such vehicle may benefit from an onboard assistant as described in this specification.

As will be appreciated by one skilled in the art, aspects of the present disclosure, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a circuit, module, or system. In at least some cases, a circuit may include the physical hardware of the circuit, plus any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The foregoing detailed description presents various descriptions of specific certain embodiments. However, the innovations described herein may be embodied in a multitude of different ways, for example, as defined and covered by the claims and/or select examples. In the following description, reference is made to the drawings where like reference numerals may indicate identical or functionally similar elements. It will be understood that elements illustrated in the drawings are not necessarily drawn to scale. Moreover, it will be understood that certain embodiments may include more elements than illustrated in a drawing and/or a subset of the elements illustrated in a drawing. Further, some embodiments may incorporate any suitable combination of features from two or more drawings.

The preceding disclosure describes various illustrative embodiments and examples for implementing the features and functionality of the present disclosure. While components, arrangements, and/or features are described below in connection with various example embodiments, these are merely examples used to simplify the present disclosure and are not intended to be limiting.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) may include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A method of providing an onboard assistant for an autonomous vehicle, comprising:
   receiving sensor data, comprising sensor logs from sensors of the autonomous vehicle and state logs of the autonomous vehicle carrying a rider;
   inferring from the sensor data that a service incident has occurred;
   determining contextual information of the service incident; and
   resolving the service incident, based on the inferred service incident and the contextual information.

2. The method of claim 1, wherein the sensor data comprise one or more of:
   information for a service session associated with the autonomous vehicle;
   trip information for a planned trip of the autonomous vehicle; and
   current location information for the autonomous vehicle.

3. The method of claim 1, wherein the sensor data comprise one or more of:
   data from a collision sensor of the autonomous vehicle;
   data from an environmental sensor;
   data from a tire pressure sensor; and
   data about external obstacles.

4. The method of claim 1, wherein determining contextual information of the service incident comprises using a camera and/or a microphone of the autonomous vehicle to identify presence of a protest or civil unrest near the vehicle.

5. The method of claim 1, wherein the contextual information comprises historical rider sentiment data.

6. The method of claim 1, wherein the contextual information comprises historical service incident data of the autonomous vehicle.

7. The method of claim 1, wherein the contextual information comprises steps executed to resolve previous service incidents associated with the autonomous vehicle.

8. The method of claim 1, wherein the contextual information comprises steps executed to resolve previous service incidents associated with the rider of the autonomous vehicle.

9. The method of claim 1, wherein determining contextual information of the service incident comprises determining a medical condition of the rider in the autonomous vehicle using vital sign monitoring sensors in the autonomous vehicle.

10. The method of claim 1, wherein the contextual information of the service incident comprises profile data associated with the rider of the autonomous vehicle.

11. The method of claim 1, wherein determining contextual information of the service incident comprises determining a sentiment of the rider in the autonomous vehicle using image sensor(s) and/or audio sensor(s) in the autonomous vehicle.

12. The method of claim 1, wherein determining contextual information of the service incident comprises determining a sentiment of the rider in the autonomous vehicle using seat occupancy sensor(s) in the autonomous vehicle and/or seat temperature sensor(s) in the autonomous vehicle.

13. The method of claim 1, wherein:
   the contextual information comprises a copy of a user interface being displayed to a rider of the autonomous vehicle.

14. The method of claim 13, further comprising:
   causing the copy of the user interface to be displayed to a service agent resolving the service incident.

15. The method of claim 1, further comprising:
   generating recommendation(s) or instruction(s) to a service agent resolving the service incident, based on the inferred service incident and the contextual information.

16. The method of claim 15, further comprising:
   causing the recommendation(s) or instruction(s) to be displayed to the service agent.

17. The method of claim 1, further comprising:
   assigning an initial service mode based on the inferred service incident;
   receiving rider sentiment data as part of the determined contextual information; and
   adjusting the initial service mode to a different service mode in response to the rider sentiment data.

18. The method of claim 1, further comprising:
   causing the contextual information to be displayed to a service agent.

19. A computing system for managing a fleet of autonomous vehicles, comprising:
   one or more processors;
   one or more memories; and
   instructions encoded within the one or more memories to instruct the one or more processors to:
      receive sensor data, comprising sensor logs from sensors of an autonomous vehicle in the fleet of autonomous vehicles and state logs of the autonomous vehicle carrying a rider;
      infer from the sensor data that a service incident has occurred;
      determine contextual information of the service incident; and
      resolve the service incident, based on the inferred service incident and the contextual information.

20. One or more non-transitory computer-readable storage media having stored thereon machine-executable instructions to:
   receive sensor data, comprising sensor logs from sensors of an autonomous vehicle in a fleet of autonomous vehicles and state logs of the autonomous vehicle carrying a rider;
   infer from the sensor data that a service incident has occurred;
   determine contextual information of the service incident; and
   resolve the service incident, based on the inferred service incident and the contextual information.

* * * * *